United States Patent [19]
Salter et al.

[11] Patent Number: 5,629,595
[45] Date of Patent: May 13, 1997

[54] METHOD AND APPARATUS FOR AN AMUSEMENT RIDE HAVING AN INTERACTIVE GUIDED VEHICLE

[75] Inventors: Kenneth D. Salter, Glendale; Daniel A. Armstrong, Simi Valley; John D. Charlesworth, Anaheim, all of Calif.; Robert S. Bollinger, Thomasville, Pa.

[73] Assignee: The Walt Disney Company, Burbank, Calif.

[21] Appl. No.: 492,196

[22] Filed: Jun. 19, 1995

[51] Int. Cl.⁶ .................. B62D 1/00; G05D 1/03; A63G 25/00

[52] U.S. Cl. .................. 318/587; 318/588; 180/168; 104/53

[58] Field of Search .................. 318/139, 488, 318/489, 580, 587, 588, 608; 180/6.2, 6.24, 167, 168, 79; 104/53, 60, 77, 78, 287, 288, 292; 191/22 R; 364/424.01, 424.02

[56] References Cited

U.S. PATENT DOCUMENTS

| | | |
|---|---|---|
| 3,033,305 | 5/1962 | Harned et al. . |
| 3,045,221 | 7/1962 | Roop . |
| 3,556,244 | 1/1971 | Gray . |
| 3,669,205 | 6/1972 | Brooke .................. 318/608 X |
| 4,176,728 | 12/1979 | Otteblad et al. . |
| 4,920,890 | 5/1990 | Barber . |
| 5,079,706 | 1/1992 | Yamaguchi et al. . |
| 5,175,480 | 12/1992 | McKeefery et al. . |
| 5,234,070 | 8/1993 | Noah et al. . |
| 5,361,705 | 11/1994 | Powell . |
| 5,481,460 | 1/1996 | Masaki et al. .................. 318/587 |
| 5,519,296 | 5/1996 | Day .................. 318/587 |

*Primary Examiner*—Bentsu Ro
*Attorney, Agent, or Firm*—Pretty, Schroeder, Brueggemann & Clark

[57] ABSTRACT

An apparatus and method in which a vehicle is guided along a path defined by a centerline and left and right boundaries parallel to and spaced laterally on opposite sides thereof and in which a passenger in the vehicle can steer it for lateral movement between the boundaries. The method and apparatus utilize an electrical conductor to define the center of the pathway and a sensor for sensing the position of the vehicle relative to the electrical conductor. Based on a comparison of the position of the vehicle and the steering command received from the passenger, as well as the steer angle position of the vehicle, the vehicle is confined to a predetermined envelope, while permitting the passenger to steer the vehicle within the envelope.

13 Claims, 8 Drawing Sheets

METHOD AND APPARATUS FOR AN AMUSEMENT RIDE HAVING AN INTERACTIVE GUIDED VEHICLE

This invention relates generally to amusement rides and, in particular, to amusement rides having an interactive guided vehicle that a passenger can steer within a predetermined envelope.

BACKGROUND OF THE INVENTION

Amusement parks and theme parks presently operate a variety of rides for the pleasure of their patrons. One type of ride permits vehicles to follow a predetermined path, but with a limited amount of passenger steering. The vehicle is restricted from steering off of the path by a steel rail acting as a physical barrier defining the center of the pathway. During the progression of the ride, if a passenger attempts to steer more than a specified distance from the center of the pathway, the guide wheels on the front wheel steering knuckles of the vehicle collide with the steel rail, causing the vehicle to steer back towards the center of the pathway.

Typically, when the guide wheels of the vehicle collide with the steel rail, an abrupt, uncomfortable impact is felt within the vehicle. To prevent injury to the passenger, the mechanical coupling between the steering wheel and the wheels must be compliant, which causes the steering for the passenger to be imprecise. The impact of the guide wheels colliding with the steel rail also causes increase wear to the vehicle, requiring frequent servicing of the vehicle. Additionally, the visual impression of the center rail taints the experience for the passenger, since it is immediately apparent that the vehicle is constrained to a track.

Similarly, boat rides restrict a passenger's steering by the use of a steel rail or other type of physical barrier. Although the barrier in boat rides can be hidden beneath the water's surface, the barrier still causes an impact with the boat when the passenger steers past a predetermined lateral position or envelope. As mentioned above, such an impact is a disadvantage for an amusement ride. Accordingly, it is important to allow a passenger in an amusement ride to steer a vehicle along a pathway without having a physical barrier or rail constraining the lateral movement of the vehicle, while at the same time restricting the vehicle's lateral movement to a predetermined envelope.

Techniques have been developed for steering vehicles along a predetermined pathway. These techniques have included automatic steering control systems to maintain the vehicle on a specific pathway, as defined by a current-carrying wire embedded beneath the pathway. Typically, in these systems the vehicle is under complete automatic control, without any passenger control. If a lateral displacement of the vehicle is sensed, a signal is directed to the steering mechanism for directing the vehicle along the pathway. Although the vehicle follows the pathway, the passenger is unable to control the vehicle, because the steering of the vehicle is completely automatic.

Alternative techniques have been developed for steering vehicles along a pathway while allowing for automatic or manual control of the vehicle. Typically, in these systems, the vehicle is operable in either of two modes, manual or automatic. Such systems, for example, are used in commercial factory operations. In the manual mode, the vehicle is under the control of a user. On the other hand, in the automatic mode, there is no user interaction for steering the vehicle. While these systems have provided for greater versatility over the completely automatic steering systems, the systems do not allow for responsive passenger steering within a preset lateral distance, while restricting lateral movement of the vehicle to an envelope.

One system previously developed combined both automatic and manual modes. This system was used to guide a vehicle along a pathway defined by a wire. The automatic system provided a force on the steering mechanism that was less than the force the driver of the vehicle could apply if the driver wanted to steer the vehicle manually. While this system helped to guide the vehicle, the driver could manually override the automatic steering system and the vehicle would not be restrained to a preset pathway.

In view of the above, it should be appreciated that there is a need for an apparatus and method for permitting a passenger to steer a vehicle along a pathway, within a predetermined envelope from the center of the pathway, without having a physical barrier to constrain the lateral movement of the vehicle and without allowing the passenger to manually override the vehicle system for detouring from the defined envelope. Such a vehicle system would significantly add to the passenger's experience in an amusement ride, because the system would provide for a vehicle that is responsive to the passenger, while at the same time restricting the vehicle to a predetermined pathway. Thus, the passenger has the visual impression of driving the vehicle on an open road (or boat on water) and the problems associated with vehicle damage, passenger discomfort and imprecise steering, resulting from vehicle collisions with a physical barrier, are vastly reduced. The present invention satisfies these needs.

SUMMARY OF THE INVENTION

The method and apparatus of the present invention permit a passenger of an amusement ride to steer a vehicle along a predetermined path whereby an electrical conductor, such as a buried wire, defines a centerline. The path is defined by the centerline and left and right boundaries parallel to and spaced laterally on opposite sides thereof. An alternating current (AC) source injects an electrical signal of predetermined frequency along the buried wire so as to create a magnetic field about the wire. The magnetic field is sensed by a vehicle position sensor, that includes coils located on the vehicle, and utilized by a vehicle position controller to confine the vehicle's lateral movement to a predetermined envelope that follows the path.

The vehicle includes a passenger compartment, an accelerator pedal, a brake pedal, and a steering control such as a steering wheel. The passenger controls the vehicle by using the accelerator pedal to drive the vehicle forwardly, the brake pedal to reduce the vehicle's speed, and the steering wheel to guide the vehicle's direction.

A control system senses the position of the vehicle and compares the vehicle's position to the passenger's desired lateral position to generate a commanded tire steer angle. In addition, the control system senses the position of the current tire steer angle and compares the sensed tire steer angle to the commanded tire steer angle to cause the vehicle to move laterally.

In particular, a vehicle position sensor located on the vehicle provides a signal indicative of the vehicle's lateral position relative to the buried wire, and a steering command controller associated with the steering wheel provides a signal indicative of the steering wheel's current position, which represents the desired vehicle lateral position selected by the passenger. These two signals are compared with each other by a controller, which produces a signal representing the difference between the two signals. That difference is a measure of the amount of the vehicle's lateral deviation from its desired lateral position on the path. This results in a commanded steer angle of the vehicle's wheels to correct the deviation. A tire steer angle sensor provides a signal indicative of the wheels position. The commanded steer angle and the wheels sensed position are compared with each other by a steer rate signal controller, which produces a signal representing the rate at which the angle of the wheels should move. This signal is input to the vehicle steering unit for causing the vehicle to move left or right.

The present invention provides a method and apparatus for allowing a passenger to steer the vehicle within a predetermined envelope, which is intended to solve the problems which have been described. In particular, it is intended to provide a method and apparatus for interactive guiding of a vehicle, which permits a passenger to steer the vehicle along a predetermined pathway, without having a physical barrier to constrain the lateral movement of the vehicle. Additionally, it is intended to provide a method and apparatus which does not allow the passenger to manually override the vehicle control system for detouring from the defined envelope. As a result, the present invention interacts with the passenger steering the vehicle, to guide the vehicle along a pathway defined by a buried wire.

In the preferred embodiment, a wire carrying an alternating current is buried beneath the ground's surface, at about 1 foot beneath the coils of the vehicle position sensor. The current in the wire is generated with the use of an electronic device, such as an audio amplifier, generating a 5000 Hertz (Hz) sine wave signal. Such a signal passing through the wire causes a time varying magnetic field about the wire which is monitored for sensing the lateral distance from the center of the pathway.

The apparatus of the present invention also includes a proximity sensor that senses lateral displacement between the vehicle and the buried wire. In the preferred embodiment, the proximity sensor is made up of four coils mounted on the front bumper of the vehicle. The use of four coils, two inner coils and two outer coils, instead of simply two coils, allows the system to be more responsive to the actual position of the vehicle relative to the wire. The two pairs of coils act in conjunction to detect whether the vehicle is left or right of the buried wire. Proper sensing is accomplished because the voltage of each coil is greatest when the wire is directly beneath a particular coil. Therefore, when the center of the vehicle is to the right of the buried wire the two coils on the left side of the bumper identify a greater magnetic field than the two coils on the right side of the bumper. As a result, the preferred embodiment has increased performance characteristics.

In the practice of the method of the present invention, the AC current generator generates a magnetic field in the buried wire. The steering position of the steering wheel is detected and compared to the sensed position of the vehicle causing a lateral position difference signal. This lateral position difference signal is a measure of the amount of the vehicle's lateral deviation from its desired position on the path. The lateral position signal is compared to the steer angle of the wheels. Based on this comparison, an adjustment is made to the steer angle of the wheels for guiding the vehicle along the pathway defined by the magnetic field from the buried wire.

The method of this invention, and the apparatus used to implement it, do not allow the passenger to exceed a predetermined lateral distance from the center of the pathway, and this restriction is accomplished without having a physical barrier constraining the lateral movement of the vehicle. As a result, the problems associated with a physical barrier constraining the vehicle's lateral movement, such as vehicle damage, passenger discomfort and imprecise steering, are greatly reduced. In addition, the passenger has the visual impression of driving the vehicle on an open road. Therefore, the method and apparatus of the present invention significantly adds to the experience in an amusement ride.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENT

Figure 1:
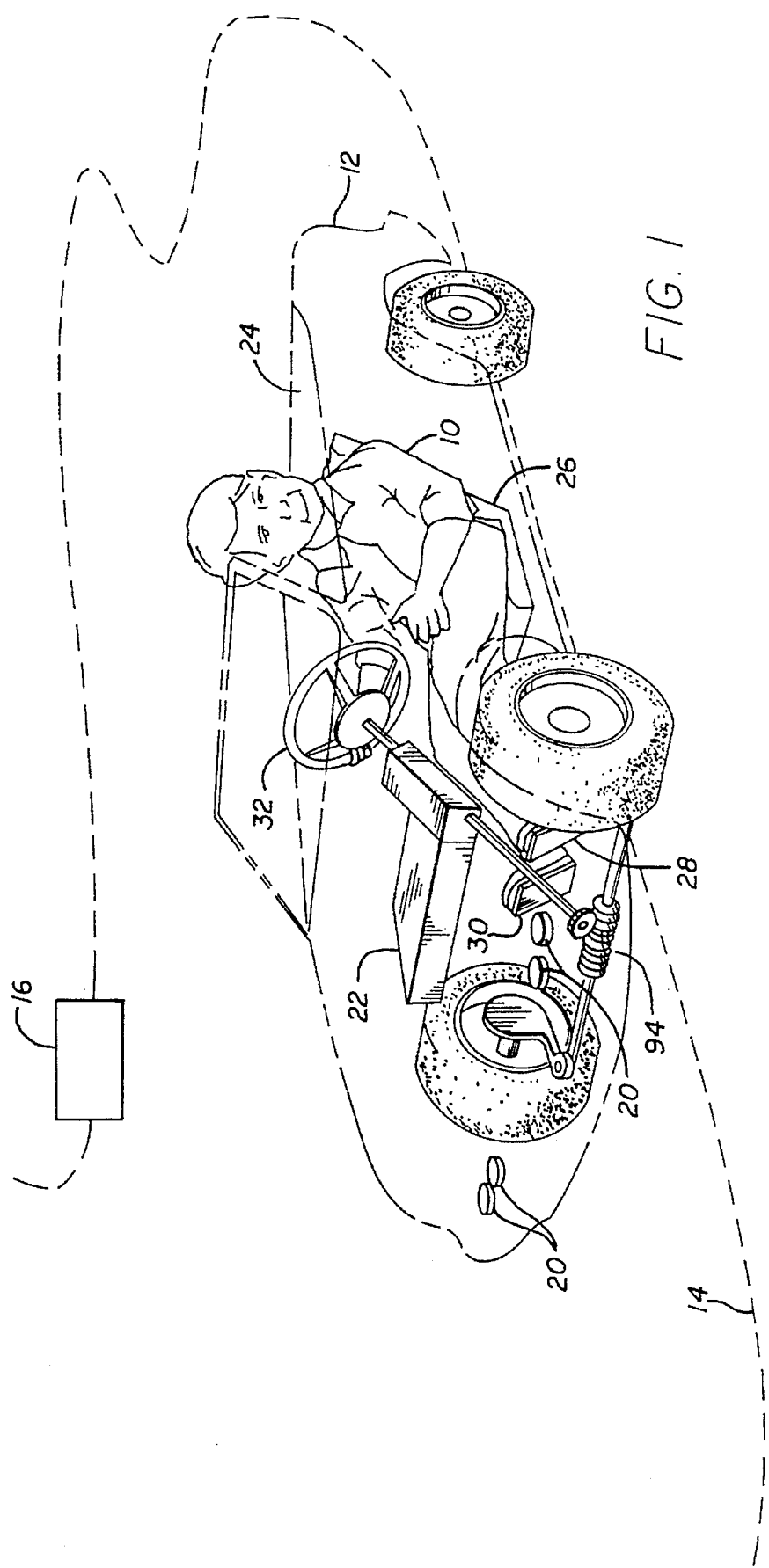
FIG. 1 is a plan view of an interactive guided vehicle showing the principal components of the apparatus of the present invention.
Figure 2:
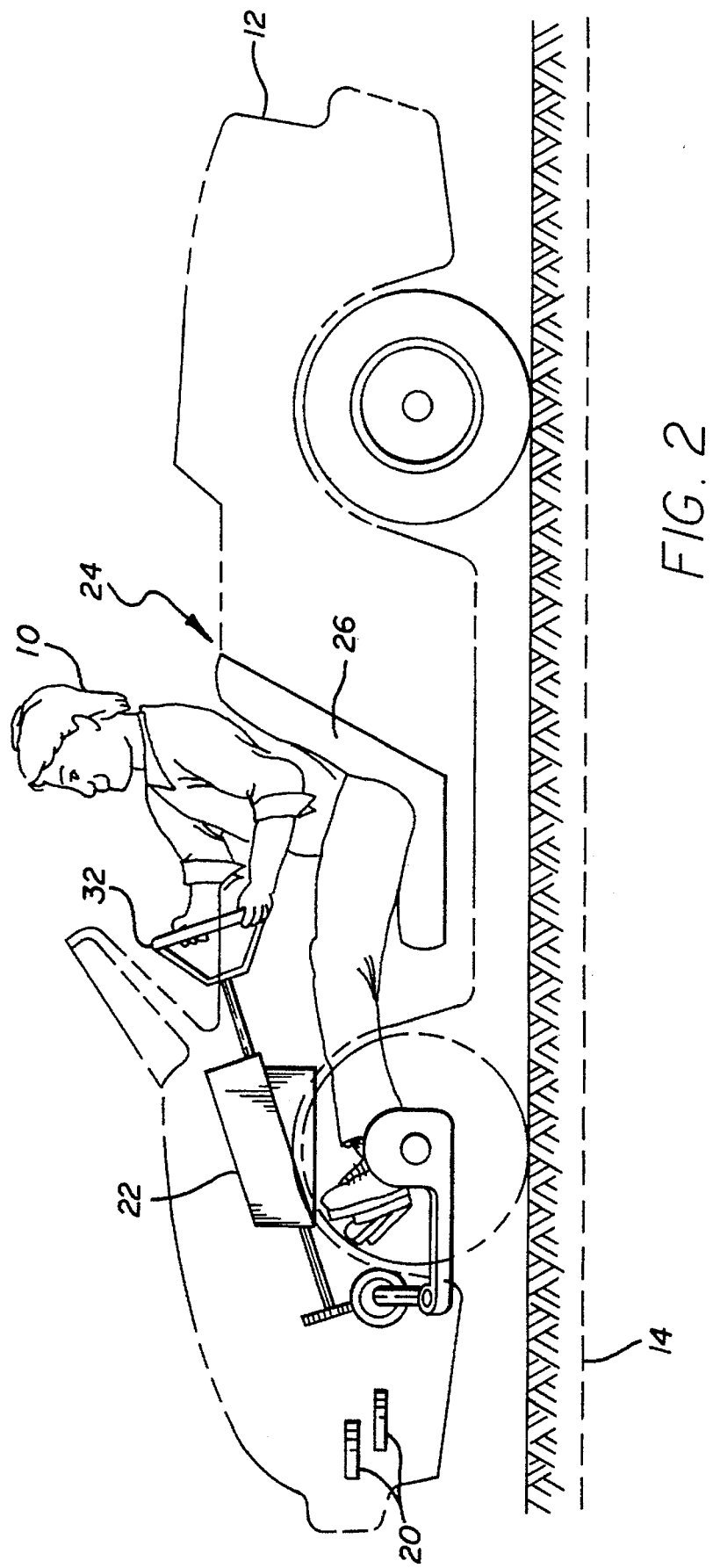
FIG. 2 is a simplified representational side view of an interactive guided vehicle showing the principal components of the preferred embodiment of the present invention.
Figure 3:
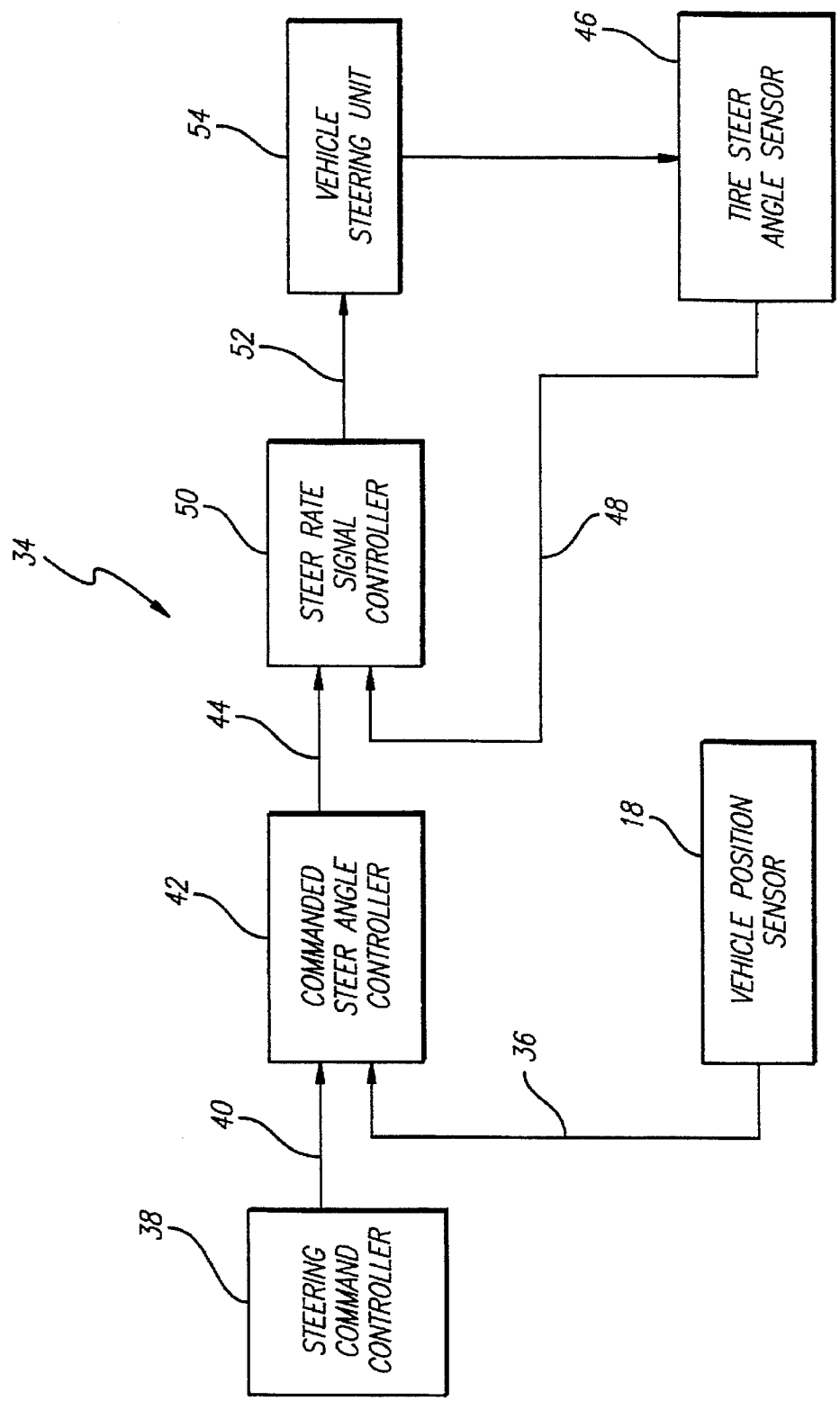
FIG. 3 is a simplified block diagram of the vehicle control system.

With reference now to the drawings, and particularly to FIGS. 1–3, there is shown an interactive guided vehicle having steerably mounted wheels in which a passenger 10 can steer a battery-powered vehicle 12 along a predetermined path whereby an electrical conductor, such as a buried wire 14, defines a centerline. The vehicle could also be powered by a gasoline engine with an on-board generator. The path is defined by the centerline and left and right boundaries parallel to and spaced laterally on opposite sides thereof which form a predetermined envelope. An AC current source 16 conducts a predetermined electrical signal along the buried wire so as to create a magnetic field about the wire, which is sensed by an electromagnetic sensor, or vehicle position sensor 18, that includes coils 20 located on the vehicle and utilized by a vehicle position controller 22 to confine the vehicle's lateral movement to a predetermined envelope that follows the path.

The vehicle 12 includes a passenger compartment 24 having a seat 26, an accelerator pedal 28, a brake pedal 30, and a lateral position or steering control, such as a steering wheel 32. The passenger 10 controllably guides the vehicle using the accelerator pedal to drive the vehicle forwardly, the brake pedal to reduce the vehicle's speed, and the steering wheel to laterally guide the vehicle's direction.

FIG. 3 is a block diagram of a vehicle control system 34 for limiting the lateral movement of the vehicle 12 to the predetermined envelope defined by the wire 14. The control system senses the position of the vehicle relative to the wire and compares the vehicle's position to the passenger's desired lateral position to generate a commanded steer angle. In addition, the control system senses the current tire angle and compares the sensed tire angle to the commanded steer angle, to cause the vehicle to move laterally.

In particular, a vehicle position sensor 18 located on the vehicle 12 provides on line 36 a signal proportional to the lateral spacing of a reference point on the vehicle from the buried wire 14 (indicative of the vehicle's lateral position relative to the buried wire). In the preferred embodiment, the reference point is centered on a sensor strip on the front of the vehicle for determining where the vehicle is relative to the buried wire. In addition, a steering command. controller 38 associated with the steering wheel 32 provides on line 40 a signal indicative of the steering wheel's current position, which of course represents the desired vehicle position selected by the passenger 10. These two signals, on line 36 and 40, are compared with each other by a commanded steer angle controller 42, which outputs on line 44 a commanded steer angle signal representing the difference between the two signals. That difference is a measure of the amount of the vehicle's lateral deviation from its desired position on the path, which represents the commanded steer angle of the vehicle's wheels.

A tire steer angle sensor 46 senses the angle of the wheels and provides a corresponding tire angle signal on line 48. The commanded steer angle signal on line 44 and the tire angle signal on line 48 are compared with each other by a steer rate signal controller 50, which outputs on line 52 a steer rate signal representing the rate at which the angle of the wheels should be changed. This steer rate signal is input to the vehicle steering unit 54, for causing the tires to steer left or right.

STEERING COMMAND CONTROLLER

Figure 4:
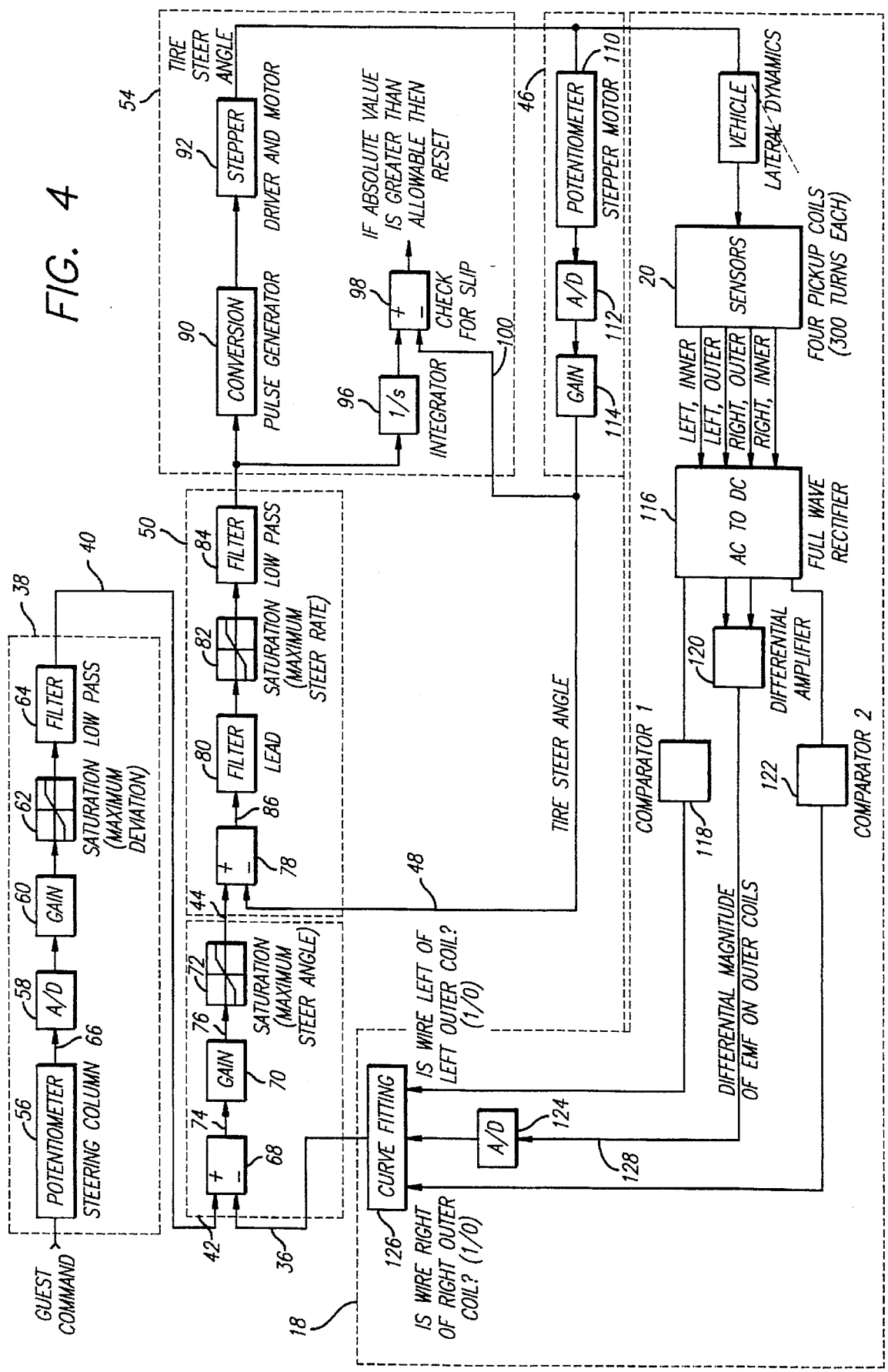
FIG. 4 is a detailed block diagram showing the connection of components of the preferred embodiment for the vehicle control system.

More specifically, and with reference to FIGS. 3 and 4, the amusement ride includes electronic and mechanical devices that communicate to interactively guide the vehicle 12 along the pathway. The steering command controller 38 monitors the steering wheel 32, and provides a signal on line 40 indicative of the steering wheel's current position, which represents the desired vehicle position selected by the passenger 10, that is, the passenger's lateral position command.

The steering command controller 38 includes a steering column potentiometer 56, an analog-to-digital converter (A/D) 58, a gain amplifier 60, a saturation filter 62, and a low-pass filter 64. The steering wheel 32 engages a steering column which is coupled to a steering column potentiometer, which provides on line 66 a signal indicative of the position of the steering wheel, that is, the passenger's lateral position command or steering command. An A/D 58 converts the analog signal from the potentiometer 56 to a digital signal. The output signal from the A/D is fed to a gain amplifier 60 for converting the steering command to a predetermined set of units (e.g., lateral distance in feet), so that the signal can later be directly compared to the sensed position of the vehicle 12. The output signal from the gain amplifier 60 passes through a saturation filter 62 which effectively places maximum and minimum limits on the steering command. The saturation filter prevents the passenger's steering command from forcing the vehicle too much to the left or the right of the buried wire's position. The steering command signal then passes through a low-pass filter 64 which blocks the passage of all signals above the bandwidth of the outer feedback loop (represented by the vehicle position sensor 18), yet allows signals below to be transmitted on.

This low-pass filter 64 prevents the passenger 10 from exciting the system, by forcing the steering wheel left and right, to its resonant frequency, causing extreme lateral deviations. The output signal from the low-pass filter constitutes the output signal of the steering command controller which provides a steering command signal on line 40 corresponding to the passenger's steering command.

COMMANDED STEER ANGLE CONTROLLER

To ensure proper guiding of the vehicle 12, the passenger's steering command must be compared to the sensed lateral position of the vehicle. The passenger's steering command signal on line 40 is compared to the lateral position signal of the vehicle on line 36 (discussed below). These two signals are compared by the commanded steer angle controller 42, which outputs on line 44 a signal representing the difference between the two signals. That difference is a measure of the amount of the vehicle's lateral deviation from its desired position on the path, which represents the commanded steer angle of the vehicle's wheels. In particular, the passenger's steering command signal from the steering command controller 38 is processed by the commanded steer angle controller 42 to provide on line 44 a steer angle signal which is dependent upon not only the passenger's steering position, but also the lateral position of the vehicle.

The commanded steer angle controller 42 includes a differential amplifier (unity gain) 68, a proportional error gain amplifier 70, and a saturation filter 72. The passenger's steering command signal is compared, with the use of the differential amplifier 68, to the lateral position signal (discussed below) of the vehicle on line 36. After comparing the passenger's steering command and the lateral position of the vehicle, the differential amplifier outputs on line 74 a signal indicative of the lateral position error between the two signals. This lateral position error signal is converted, with the use of the proportional error amplifier 70, to a tire steer angle command signal on line 76 which causes, after further processing, the front wheels to move a specific amount to the left or right. In the case of a boat ride, the steer angle command causes the rudder of the boat to move left or right.

The tire steer angle command signal also is fed to a saturation filter 72, preventing the steer angle command from being greater than the physical steering capability of the front wheels. The saturation filter outputs on line 44 the commanded steer angle signal, representing the required tire angle to guide the vehicle along the pathway.

STEER RATE SIGNAL CONTROLLER

To effectively control the rate at which the angle of the wheels should move, the commanded steer angle signal on line 44 is compared to the sensed position of the front wheels, the tire steer angle signal one line 48. A tire steer angle sensor 46 outputs on line 48 the tire steer angle signal, which is indicative of the wheels position. These two signals, the commanded steer angle signal and the tire steer angle signal, are compared by the steer rate signal controller 50, which outputs on line 52 a signal representing the rate at which the angle of the wheels should move, the tire steer rate signal.

The steer rate signal controller 50 consists of a differential amplifier 78, lead filter 80, saturation filter 82, and a low-pass filter 84 to control the rate at which the wheels turn. With the use of the differential amplifier 78, the commanded steer angle signal on line 44 is compared to the sensed tire steer angle signal on line 48 of the vehicle 12. After comparing these signals, the differential amplifier outputs an output signal on line 86 representing the difference between the two signals. That difference is a measure of the amount of the tire's steer angle deviation from the desired tire steer angle, the steer angle difference. This difference signal on line 86 is driven through the lead filter 80 for improving the response of the steering feedback system. The lead filter introduces anticipation into the system by not only reacting to the magnitude of the steer angle difference but also to its rate of change. The lead filter outputs on line 88 the rate at which the wheels should move, the steer rate command. This signal is fed to the saturation filter 82 for preventing the steer rate command from being greater than a predetermined maximum. The steer rate command signal can be represented as a number of steering steps per unit time in response to the steer angle difference signal.

The saturation filter 82 then transmits the signal to a low-pass filter 84. The low-pass filter prevents the steer rate command from changing too quickly, and outputs on line 52 a signal representing the steer rate command. The low-pass filter 84 effectively limits the steer rate command so that it does not exceed a predetermined amount. This filtering is necessary since the low-pass filter outputs on line 52 a steer rate signal to the vehicle steering unit 54 and thus, this steer rate signal must not exceed the maximum torque available from the vehicle steering unit.

VEHICLE STEERING UNIT

In response to the steer rate signal on line 52, the vehicle steering unit 54 causes the vehicle 12 to move left or right. The vehicle steering unit consists of a steer rate converter 90, or pulse generator, a stepper motor 92, stepper motor slip detection components, and a rack and pinion 94 which is coupled to the wheels. The steer rate signal is input over line 52 to the vehicle steering unit. This input signal must first be converted, e.g., from radians per second, to an appropriate input to the stepper motor. The steer rate converter 90 converts the steer rate command into corresponding electrical pulses which are communicated to the stepper motor 92. The stepper motor is coupled to a rack and pinion 94, the steering point of the vehicle, for steering the vehicle. Between the stepper motor and the rack and pinion is a shaft, whereby the upper end of the shaft is coupled to the stepper motor and the lower end of the shaft is coupled to the pinion. In response to the electrical pulses from the pulse generator, the stepper motor 92 rotates a number of degrees in response to each electrical pulse, causing the shaft to rotate and thereby the pinion rotates, thus shifting the rack to the right or left, causing the vehicle to turn angularly and move laterally.

Additionally, in the preferred embodiment, the vehicle steering unit 54 includes features which minimize and detect stepper motor slip. Such stepper motor slip detection techniques can be implemented in various ways. For example, in the preferred embodiment, the steer rate command 52 is input to a conventional integrator circuit 96, for summing the changes of the steer rate command. With the use of a differential amplifier 98, the output from the integrator is compared to the motor potentiometer signal on line 100. If the difference between the two signals at the differential amplifier is too large, the motor is presumed to be slipping and the motor's controller is reset so that the slipping can be eliminated.

TIRE STEER ANGLE SENSOR

As described above, to properly guide the steering of the vehicle 12, the tire steer angle position must be fedback to the steer rate controller 50. In particular, the tire steer angle sensor 46 monitors the tire steer angle and provides a signal indicative of the position of the wheels to the steer rate controller 50. The tire steer angle sensor consists of a stepper motor potentiometer 110, an A/D 112, and a gain amplifier 114. The A/D converts the tire steer angle signal to a digital signal for processing by the gain amplifier 114 to assure that the tire steer angle signal on line 48 can be directly compared to the commanded steer angle signal, as described above.

VEHICLE POSITION SENSOR

Figure 7:
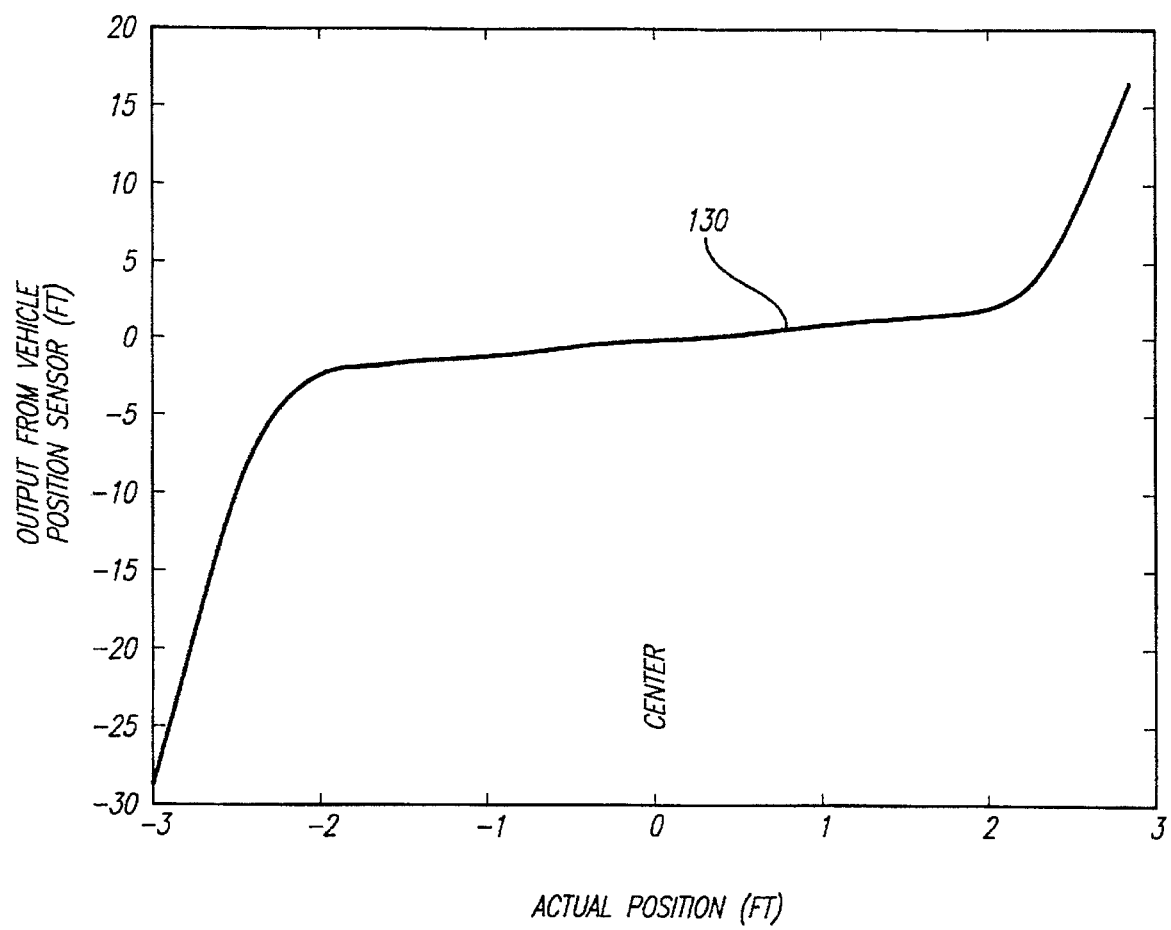
FIG. 7 is a graph of the system sensitivity, as measured by a four coil sensor, representing the sensor output after curve fitting and conditioning of the signal, versus the actual position of the vehicle.

Not only must the actual tire steer angle be fedback to the system, but also the lateral position of the vehicle 12 must be fedback to the commanded steer angle controller 42 for effective guidance of the vehicle along the pathway. As discussed above, a vehicle position sensor 18 located on the vehicle provides on line 36 a signal indicative of the lateral distance between a reference point on the vehicle and the buried wire 14 (representing the vehicle's lateral position relative to the buried wire). The vehicle position sensor 18, shown in FIGS. 3 and 4, communicates to the commanded steer angle controller 42 the vehicle position signal on line 36. In the preferred embodiment, the relationship between the output from the vehicle position sensor and the actual position of the vehicle is shown in FIG. 7. The non-linear relationship shown in FIG. 7 (i.e., outside the actual position range of less than minus two feet and greater than plus two feet) ensures that a maximum steering adjustment is made if the vehicle is beyond a predetermined envelope. More specifically, outside the predetermined range the magnitude of the output from the position sensor will be much greater than the passenger's steering command signal on line 40 and therefore, cause the commanded steer angle controller 42 to determine that a large deviation exists between the vehicle's position and the center of the pathway, defined by the buried wire 14. As a result, outside the predetermined range the vehicle control system 34 forces the vehicle towards the center of the pathway.

To accomplish the relationship shown in FIG. 7, the vehicle position sensor 18 consists of multiple components including pickup coils 20, a full-wave rectifier 116, a comparator 118, a differential amplifier 120, another comparator 122, an A/D 124, and a curve fitting and conditioning routine 126 for processing the signals. There are many techniques to sense the relative distance between the vehicle 12 and a buried wire 14. In the preferred .embodiment, a sensor strip on the front bumper of the vehicle consists of four coils functioning as a proximity sensor for determining where the vehicle is relative to the buried wire. More specifically, using conditioning and curve fitting to process the coil signals, in conjunction with voltages detected from the coils 20, the distance between the vehicle 12 and the wire 14 is measured. To achieve a relatively linear sensor response, the distance between the buried wire and the sensor strip on the bumper of the vehicle should be on the order of the same magnitude as the distance between coil pairs. For example, in the preferred embodiment the wire is buried about 1 foot beneath the sensor strip on the vehicle, as the vehicle travels above and along the buried wire carrying the current. The current in the wire is generated with the use of a device 16 such as an audio amplifier generating a 5000 Hertz (Hz) sine wave signal. The alternating current signal passing through the wire 14 causes a magnetic field about the wire. As a result, the magnetic field induces a voltage across each coil related to the distance each coil is from the wire. With the full-wave rectifier 116, the alternating current (AC) signal from each of the four coils 20 is converted into a pulsating direct current (DC) signal. The resulting DC signal from each coil is inversely proportional to the distance between the coil and the wire in the road. More specifically, the stronger the DC signal from a coil, the shorter the distance between that coil and the wire. As a result, the lateral distance from the center of the pathway can be readily determined.

Figure 5:
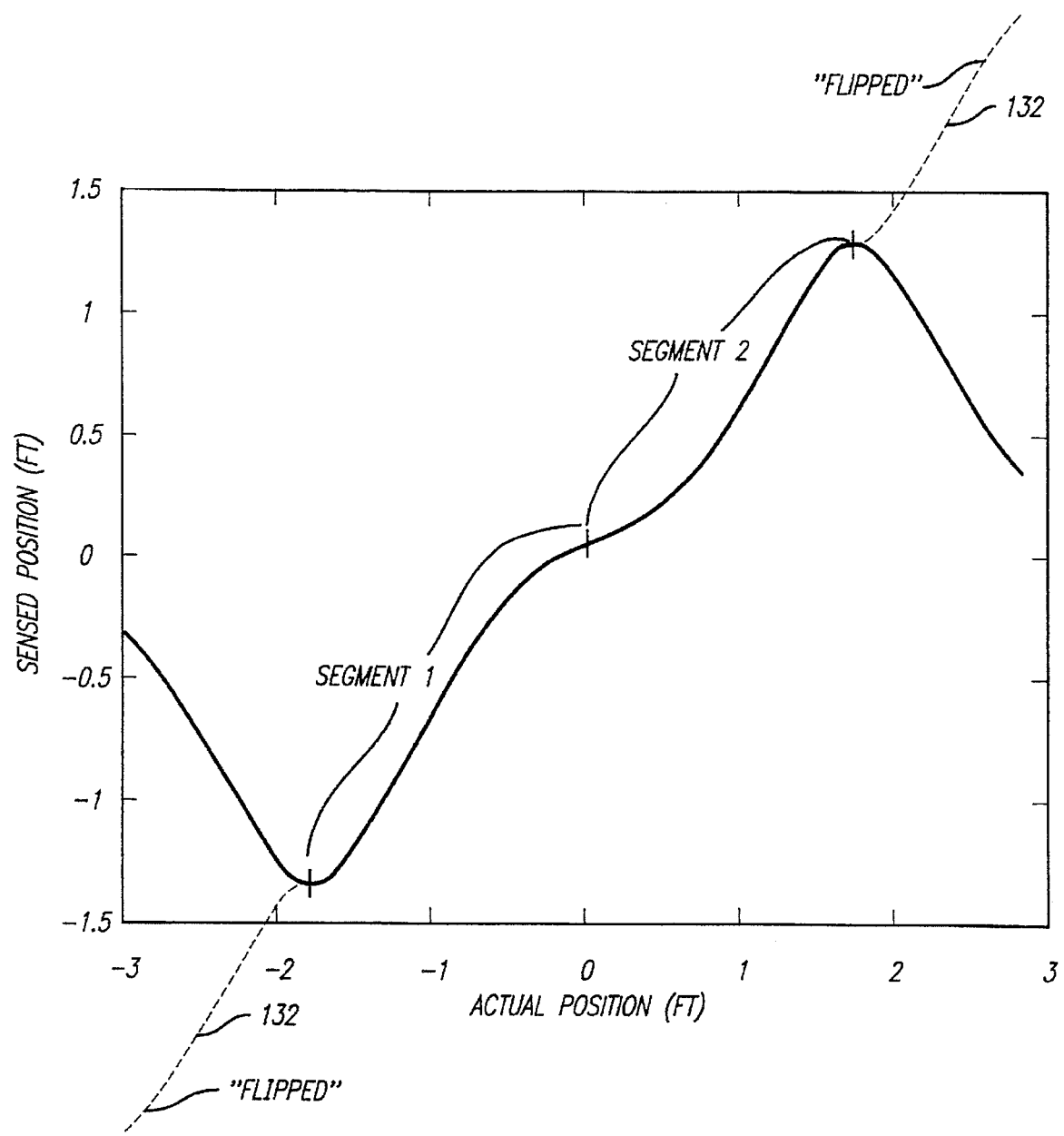
FIG. 5 is a graph of the system sensitivity representing the sensor output, as measured by only a two coil sensor, versus the actual position of the vehicle, illustrating the substantial non-linearities of a two coil lateral position sensor with the peaks corresponding to the situation when the buried wire is directly beneath one of the coils.

This lateral distance determination requires the signals from the outer two coils, of the four coils 20, to be passed through the differential amplifier 120 for providing on line 128 a differential voltage signal between the two outer coils, indicative of the distance the vehicle 12 is from the buried wire 14. While a lateral distance can be measured with only two coils, the response characteristics of a two coil sensor is limited, as shown in FIG. 5 (discussed below). As a result, further processing and additional pickup coils are needed to enhance the response characteristics of the vehicle control system 34. With the A/D 124, the differential voltage signal is converted to a digital signal for processing by the curve fitting routine 126. To enhance the performance characteristics of the vehicle position sensor, the sensed lateral position of the vehicle is subjected to a standard fifth order polynomial curve fit to achieve a linear response (e.g., see the linear characteristic of FIG. 7 ranging from the actual position of less than minus two feet and greater than plus two feet). The output from the curve fitting routine completes the outer feedback loop and provides on line 36 a signal representing the lateral position of the vehicle. It will, of course, be understood that modifications to the sensing technique to detect or sense the relative distance between the vehicle and the buried wire in the preferred embodiment will be apparent to those skilled in the art. Sensing techniques could include various electronic, magnetic, or mechanical implementations to detect the distance between the vehicle and the buried wire which defines the path for the vehicle.

As described above, with the use of the differential amplifier 68 the passenger's steering command is compared to the vehicle's lateral position signal for a determination of the vehicle's lateral deviation from its desired position on the path. The output signal of the differential amplifier is provided as input over line 74 (the lateral position difference signal), to the proportional error amplifier 70 and in response to the lateral position difference, a steering adjustment is made. The resulting tire steer angle command on line 44 from the proportional error amplifier is directly proportional to the lateral position difference signal 74. Thus, when the lateral position difference is small (e.g. when the wire 14 is inside the outer coils), a similarly small tire steer angle adjustment is made causing the vehicle 12 to drift back towards the buried wire. It will, of course, be understood that modifications to limit steering of the vehicle by the passenger 10 to occur only within a predetermined envelope will be apparent to those skilled in the art. Steering limiting routines could include various electronic, magnetic, or mechanical implementations to limit steering of the vehicle by the passenger.

Additionally, in the preferred embodiment, the vehicle position sensor 18 includes additional components, including two inner coils, to enhance the performance characteristics of the vehicle position sensor. FIG. 5 illustrates that a two coil sensor is limited. The graph of FIG. 5 shows the sensed position of the vehicle 12 versus the actual position of the vehicle by measuring the differential voltage between two coils. For example, with reference to FIG. 5, if the actual position of the vehicle is one foot to the left of the buried wire 14 the sensed position is approximately three-fourths of a foot to the left of the wire. Unfortunately, the sensed position of the vehicle is the same (i.e., three-fourths of a foot to the left), if the actual position of the vehicle is two and one-half feet to the left of the buried wire. Therefore, a two coil sensor is unable to properly sense the actual vehicle position when the buried wire 14 is outside one of the coils (e.g., greater than 1.8 feet from the buried wire as shown in FIG. 5).

Figure 6:
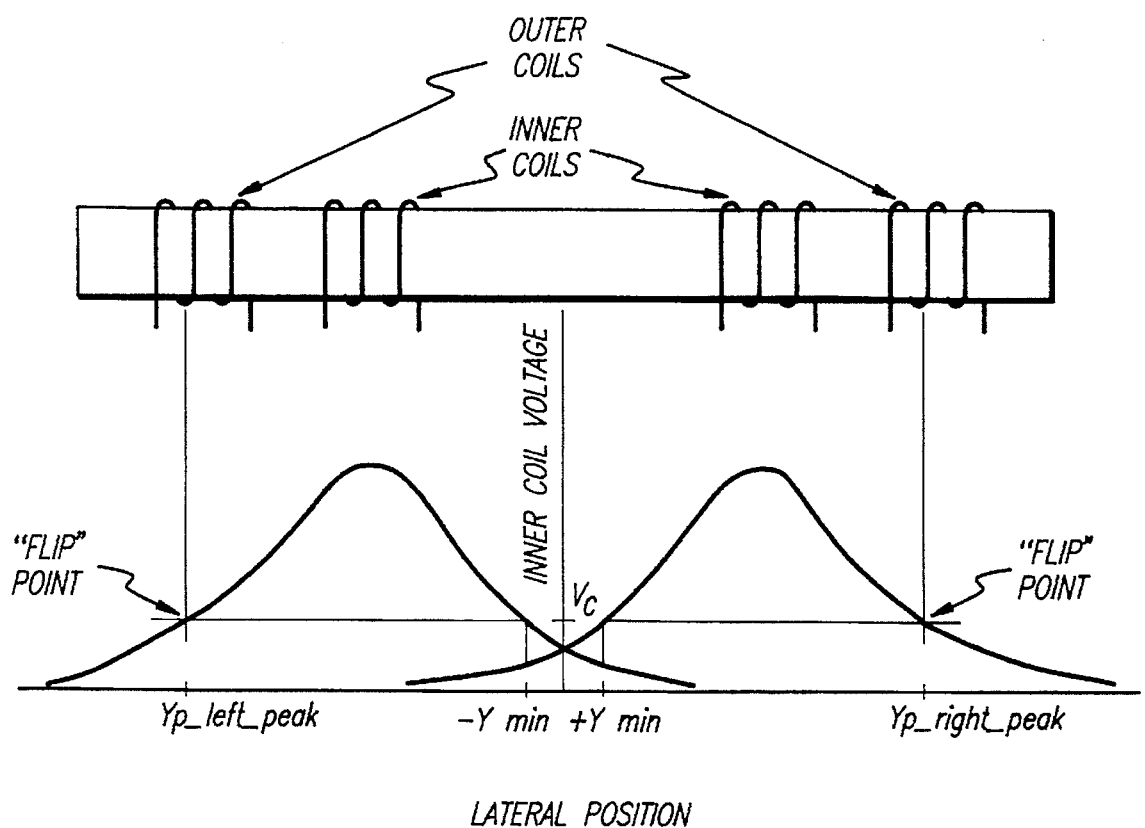
FIG. 6 is a graph of the inner coil voltage for two inner coils in a four coil sensor system, versus the lateral position of the vehicle illustrating a strong voltage signal when an inner coil is directly over the buried wire and a "flip point" when both the buried wire is directly beneath an outer coil and a particular inner coil voltage is less than $V_c$.

However, with the use of two additional inner coils and by monitoring the signal strength of the inner coils (FIG. 6), the vehicle position sensor 18 can further determine whether the buried wire 14 is outside one of the outer coils of the vehicle 12. More importantly, the four coil sensor can sense when the buried wire is just beyond one of the outer coils (e.g., greater than 1.8 feet from the buried wire in either direction as shown in FIG. 5). As shown in FIG. 5 by the dotted lines 132, when the buried wire is just beyond one of the outer coils, at a "flip point" as shown in FIG. 6, the vehicle position sensor inverts or "flips" the slope associated with the sensed position of the vehicle versus the actual position of the vehicle.

Figure 8:
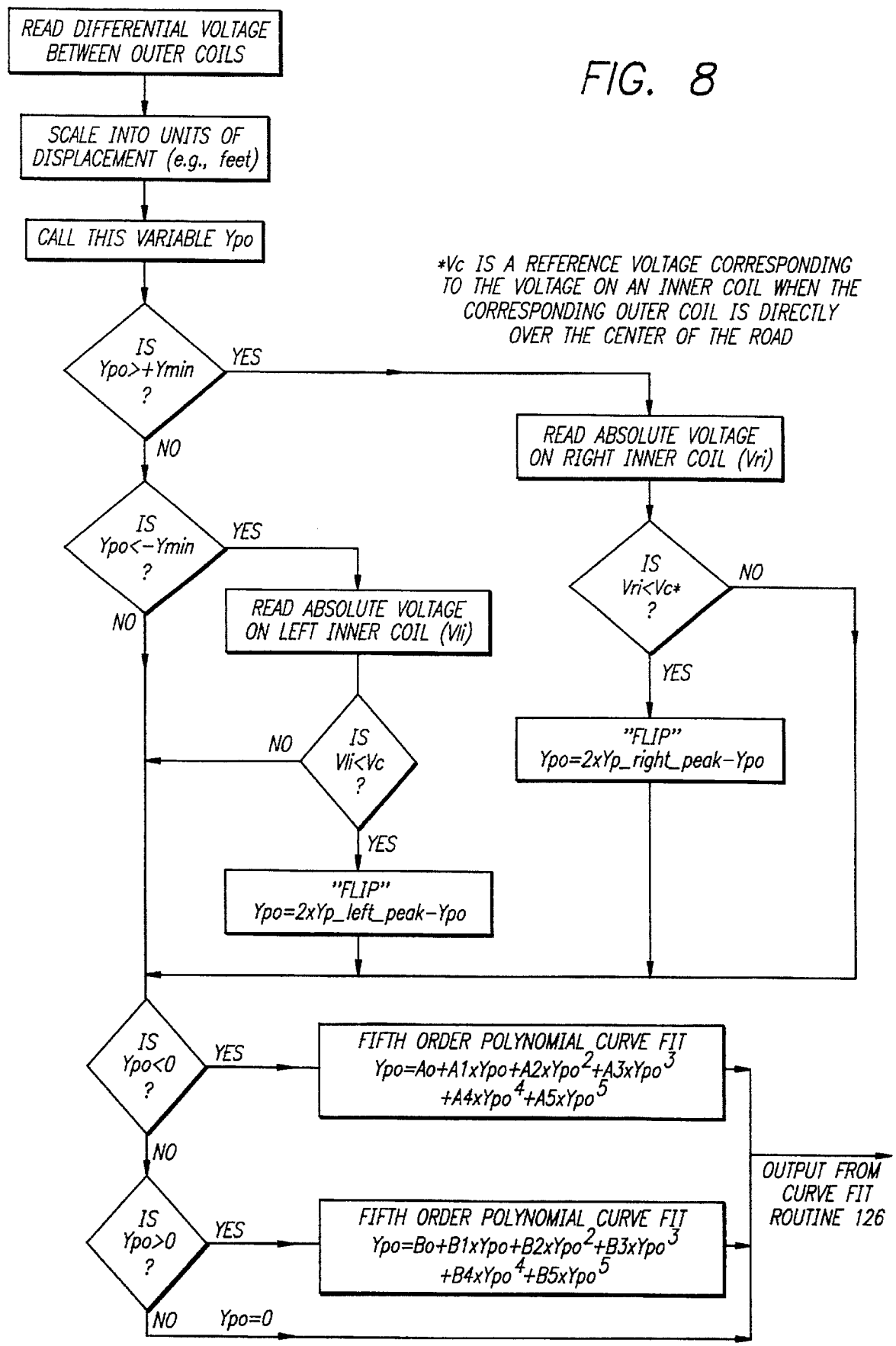
FIG. 8 is a flowchart of a portion of the vehicle position sensor including the curve fitting routine, illustrating the fifth order polynomial curve fit routine and the inverting of the vehicle position sensor output.

FIG. 8 illustrates how the vehicle position sensor 18 determines when the buried wire is outside one of the two outer coils of the four coil strip 20. The comparator 118 is used to compare the left inner coil signal to a predetermined voltage $V_c$ of FIG. 6, whereas comparator 122 is used to compare the right inner coil signal to a predetermined voltage $V_c$. In addition, as shown in FIG. 8, the differential voltage between the outer two coils (as measured by the differential amplifier 120) is scaled into a number (Ypo) representing a lateral displacement of the vehicle from the center of the pathway.

Referring to FIGS. 5–8, the lateral distance between the reference point on the vehicle and the buried wire 14 corresponds to a "flip point", that is, the wire is slightly outside (or to the left of) the left outer coil, when Ypo is less than a predetermined lateral distance (−Ymin) and the left inner coil voltage is less than $V_c$ ($Vli < V_c$). Similarly, the comparator 122 is used to determine if the wire is outside (or to the right of) the right outer coil. Again, the lateral distance between the reference point on the vehicle and the buried wire 14 corresponds to a "flip point", that is, the wire is slightly outside (or to the right of) the right outer coil, when Ypo is greater than a predetermined lateral distance (+Ymin) and the right inner coil voltage is less than $V_c$ ($Vri < V_c$). If the buried wire is external to the outer coils, then the curve fitting and conditioning routine 126 causes the slope of the output from the outer coils to be inverted, or "flipped". To accomplish this relationship, the lateral displacement variable, Ypo, is converted to a lateral displacement which corresponds to an inverted lateral displacement as shown in FIG. 5. More specifically, as shown in FIG. 8, Ypo is set equal to two times a predetermined lateral displacement corresponding to when an outer coil is directly over the wire (i.e., either Yp_left_peak or Y_right_peak) minus the sensed lateral displacement, Ypo. When the wire is outside the outer coils the output from the vehicle position sensor versus the actual lateral position of the vehicle is inverted, as shown in FIG. 7. As discussed above, and as shown in FIG. 8, the sensed lateral position of the vehicle (Ypo) is subjected to a standard fifth order polynomial curve fit 126 to achieve a linear output signal on line 36 from the curve fitting routine corresponding to the output from the vehicle position sensor 18.

A differential voltage between the outer coils which equals zero, reveals when the wire is centered between the coils corresponding to when the vehicle is directly centered (Ypo=0) over the buried wire.

As discussed above, this output signal on line 36, which corresponds to the output from the vehicle position sensor, is compared to the passenger's lateral position command at the differential amplifier 68 to produce on line 74 a lateral position difference signal which is a measure of the vehicle's lateral deviation from its desired position. Again, the resulting tire steer angle command from the proportional error amplifier 70 is directly proportional to the lateral position difference signal. Thus, when the lateral position difference is large (e.g. when the wire is outside one of the outer coils) the corresponding large tire steer angle command ensures that the vehicle is directed towards the center of the path. Consequently, the steering of the vehicle 12 by the passenger 10 is limited to within a predetermined envelope or boundaries while not allowing the passenger to exceed a predetermined lateral distance from the center of the pathway, and this restriction is accomplished without having a physical barrier constraining the lateral movement of the vehicle.

In the preferred embodiment, the signal from each coil is filtered to remove all but the 5000 Hz carrier frequency from the wire 14 in the road. In the preferred embodiment, each coil signal is filtered with a band-pass filter (not shown) which passes signals with frequencies of about 5000 Hz. As a result, only the 5000 Hz carrier frequency from the wire in the road is rectified.

It will be appreciated that the method and apparatus described above provide for an interactive guided vehicle 12 which restricts the passenger 10 from steering beyond predetermined boundaries from the center of the pathway and this restriction is accomplished without having a physical barrier constraining the lateral movement of the vehicle and with performance characteristics that are responsive to the passenger steering the vehicle. As a result, the problems associated with a physical barrier constraining the vehicle's lateral movement, such as vehicle damage, passenger discomfort and imprecise steering, are greatly reduced. In addition, the passenger has the visual impression of driving the vehicle on an open road.

It will, of course, be understood that modifications to the present preferred embodiment will be apparent to those skilled in the art. Consequently, the scope of the present invention should not be limited by the particular embodiment discussed above, but should be defined only by the claims set forth below and equivalents thereof.

What is claimed is:

1. An amusement ride of the type in which a vehicle is guided along a path defined by a centerline and left and right boundaries parallel to and spaced laterally on opposite sides thereof and in which a passenger in the vehicle can steer it for lateral movement between the boundaries, the ride comprising:

(a) an electrical conductor carrying an electrical current creating a magnetic field, said conductor extending along the centerline of the path;
   (b) motion means supporting the vehicle and for propelling it along the path, said motion means being steerable for movement of the vehicle laterally of the path;
   (c) an electromagnetic sensor mounted on said vehicle for generating an output signal proportional to the lateral spacing of a reference point on said vehicle from said conductor;
   (d) steering control means connected to said sensor and to said motion means responsive to said signal for guiding the vehicle along the path and for preventing the vehicle from moving laterally outside the boundaries of the path; and
   (e) a passenger operated steering control connected to said steering control means for enabling the passenger of the vehicle to steer it laterally of the path only up to the boundaries.

2. The amusement ride of claim 1, wherein said motion means comprises a chassis having a plurality of wheels supporting the vehicle, at least some of said wheels being driven by a motor for motion of the vehicle along the path, at least some of said wheels being steerably mounted to said chassis to enable the vehicle to be steered angularly for lateral movement.

3. The amusement ride of claim 1, wherein said motion means comprises a hull supporting the vehicle for flotation on water, and wherein said electrical conductor is insulated from and extends within a body of water on which said hull floats, at least one propeller being driven by a motor for motion of the vehicle along the path, and at least one rudder being steerably mounted to said hull to enable the vehicle to be steered angularly for lateral movement.

4. The amusement ride of claim 1, wherein said electrical conductor is a wire for carrying a current.

5. The amusement ride of claim 1, wherein said electromagnetic sensor includes four coils mounted to the vehicle.

6. The amusement ride of claim 1, wherein said electromagnetic sensor includes two coils mounted to the vehicle.

7. A vehicle control system for guiding a vehicle along a path defined by a centerline and left and right boundaries parallel to and spaced laterally on opposite sides thereof and in which a passenger in the vehicle can steer the vehicle for lateral movement between the boundaries, the control system comprising:

(a) an electrical conductor carrying an electrical current creating a magnetic field, said conductor extending along the centerline of the path;
   (b) a vehicle position sensor mounted on the vehicle, said vehicle position sensor providing a vehicle position signal that is proportional to the lateral spacing of a reference point on said vehicle relative to said electrical conductor;
   (c) a steering control that allows a passenger to steer the vehicle laterally of the path; and
   (d) a vehicle position controller operatively coupled to said vehicle position sensor and to said steering control for confining the lateral movement of the vehicle to within the boundaries.

8. The vehicle control system of claim 7, further comprising:

(a) a steering command controller coupled to said steering control, said steering command controller providing a steering command signal indicative of the current position of said steering control representing a desired lateral vehicle position by the passenger;

(b) a commanded steer angle controller coupled to both said steering command controller and said vehicle position sensor, said commanded steer angle controller providing a commanded steer angle signal representing the difference between said vehicle position sensor signal and said steering command controller signal, whereby said commanded steer angle signal is a measure of the lateral deviation of the vehicle from said desired vehicle position;

(c) a steer angle sensor coupled to the vehicle providing a steer angle signal representing the steer angle of the vehicle;

(d) a steer rate signal controller coupled to both said steer angle sensor and said commanded steer angle controller, said steer rate signal controller providing a steer rate signal representing the difference between said commanded steer angle signal and said steer angle signal; and (e) a vehicle steering unit for causing the vehicle to move laterally in response to said steer rate signal.

9. The vehicle control system of claim 8, further including a chassis having a plurality of wheels supporting the vehicle, at least some of said wheels being driven by a motor for motion of the vehicle along the path, at least some of said wheels being steerably mounted to said chassis to enable the vehicle to be steered angularly for lateral movement, wherein said vehicle steering unit further includes, a pinion rotatably mounted to a shaft, whereby the upper end of said shaft is coupled to a stepper motor and the lower end of said shaft is coupled to said pinion, a rack operably coupled to said steerably mounted wheels on said vehicle, whereby said pinion operably engages said rack causing the steerably mounted wheels to move angularly to the path in a horizontal plane.

10. An amusement ride of the type in which a vehicle is guided along a path defined by a centerline and left and right boundaries parallel to and spaced laterally on opposite sides thereof and in which a passenger in the vehicle can steer it for lateral movement between the boundaries, the ride comprising:

(a) an electrical conductor carrying an electrical current creating a magnetic field, said conductor extending along the centerline of the path;

(b) steering control means permitting the passenger of the vehicle to steer the vehicle;

(c) sensing means mounted on the vehicle for sensing the relative lateral distance between a reference point on the vehicle and said electrical conductor; and (d) vehicle steering means connected to said steering control means and to said sensing means, said vehicle steering means steering the vehicle along the path and confining the lateral movement of the vehicle to a predetermined distance on either side of the electrical conductor.

11. The amusement ride of claim 10 wherein said vehicle steering means further includes, a steer angle sensor for generating an output signal proportional to the steering of the vehicle.

12. A method for guiding a vehicle along a path defined by a centerline and left and right boundaries parallel to and spaced laterally on opposite sides thereof and in which a passenger in the vehicle can steer the vehicle for lateral movement between the boundaries, the method comprising the steps of:

(a) causing an electric current to flow through an electrical conductor, said electrical conductor extending along the centerline of the path;

(b) propelling the vehicle along the path, with a steering control for allowing the vehicle to be steerable by the passenger enabling the passenger to steer the vehicle laterally of the path only up to the boundaries;

(c) sensing a steering position of said steering control and producing a steering command signal;

(d) sensing the lateral position of a reference point on the vehicle relative to said electrical conductor and producing a vehicle position signal;

(e) comparing said vehicle position signal with said steering command signal and producing a commanded steer angle signal, whereby said commanded steer angle signal is a measure of the lateral deviation of said reference point on the vehicle from said steering position of said steering control;

(f) sensing the steer angle of the vehicle and producing a steer angle signal;

(g) comparing said steer angle signal with said commanded steer angle signal and producing a steer rate command signal; and (h) moving the vehicle laterally responsive to said steer rate command signal, for guiding the vehicle along the path and for preventing the vehicle from moving laterally outside the boundaries of the path.

13. A method for guiding a vehicle along a path as defined in claim 12, in which a stepper motor is used to move the vehicle laterally and in which the step of moving the vehicle laterally includes the step of detecting stepper motor slip.

* * * * *